Dec. 11, 1923.　　　　　　　　　　　　　　　　1,477,279
J. G. PECK
ICE CREAM FREEZING APPARATUS
Original Filed Oct. 16, 1920　　4 Sheets-Sheet 1

INVENTOR
J. G. Peck.
BY
ATTORNEYS

Dec. 11, 1923. 1,477,279
J. G. PECK
ICE CREAM FREEZING APPARATUS
Original Filed Oct. 16, 1920 4 Sheets-Sheet 3

INVENTOR
J. G. Peck.
BY
Fred G. Dieterich Co.
ATTORNEYS

Dec. 11, 1923. 1,477,279
J. G. PECK
ICE CREAM FREEZING APPARATUS
Original Filed Oct. 16, 1920  4 Sheets-Sheet 4

INVENTOR
J. G. Peck.
BY
Fred G. Dieterich Co
ATTORNEYS

Patented Dec. 11, 1923.

1,477,279

UNITED STATES PATENT OFFICE.

JACOB GUSTAVE PECK, OF PORTLAND, OREGON.

ICE-CREAM-FREEZING APPARATUS.

Application filed October 16, 1920, Serial No. 417,415. Renewed October 3, 1923.

*To all whom it may concern:*

Be it known that I, JACOB G. PECK, a citizen of the United States, residing at Portland, in the county of Multnomah and State of Oregon, have invented a new and Improved Ice-Cream-Freezing Apparatus, of which the following is a specification.

My invention relates to a certain new and useful apparatus for freezing ice cream mix. According to the present almost universal practice of manufacturing ice cream on a commercial scale, the mix is put into freezers of generally not over ten gallons capacity; the freezer is cylindrical in form, surrounded by a jacket which is insulated and the refrigerated brine is circulated through the jacket around the cylinder which brings the temperature of the cylinder below the freezing point. Inside of the cylinder is a dasher which throws the mix against the inside cold cylinder walls causing the mix to freeze on the walls, and knives attached to the dasher scrape the frozen cream from the cylinder walls and for a period of about fifteen minutes all of the ice cream mix is frozen to a temperature of about 27° when it is drawn off into receptacles and placed in a refrigerating room of about zero temperature to be frozen hard.

It is necessary in freezing ice cream to increase the volume of the mix by freezing and whipping to make it edible, otherwise it would be soggy and unpalatable. By the system of freezing now generally in use it is difficult to maintain an even overrun which is necessary to make a smooth product, because the ice cream is not frozen uniformly but frozen mix is scraped from the walls of the cylinder and mixed with unfrozen mix until it is all considered frozen but this takes some time and considerable dashing and whipping. In freezing and whipping mix under the methods at present in use the mix naturally absorbs a certain amount of air, which air is not purified but is germ and dust ladened air that is contained in the room where the workmen are employed.

My present invention has for its object to provide an apparatus of freezing the ice cream which will avoid the objectionable features of the present practice and to that end the invention resides in injecting refrigerated pure air directly into the mix (either with or without the aid of other refrigerating processes now used) and at the same time drawing off air from the interior of the cylinder to be further refrigerated and purified and returned to the mix, if desired, or a continuous stream of fresh air may be forced into the mix and the air may be exhausted from the mix and discharged to atmosphere.

My invention also embodies an improved apparatus for carrying out the process constituting my divisional application Serial No. 479,043, filed on the 20th day of June, 1921, in which apparatus provision is made for the effective agitation of the mix while the refrigerated and purified air is being passed through the mix, the apparatus being adapted for large units of 1500 gallons or more capacity, as well as for smaller units.

Another object of the invention is to provide an apparatus which may be furnished as a single working unit and in which the parts are so arranged and designed that the parts with which the cream comes in contact may be readily removed for cleaning.

In its more detail nature the invention comprises a cylinder with a detachable head through which the mix is introduced into and discharged from the cylinder, a set of dashers being provided for rotation within the cylinder in opposite direction, the dashers being driven from a suitable motor through a suitable gear train which also drives the air pump or pumps for forcing air through a refrigerating and purifying chamber into the cylinder and mix and for withdrawing air from the cylinder after it has performed its function.

In its still more detailed nature, the invention resides in those novel features of construction, combination and arrangement of parts, all of which will be first fully described, then be specifically pointed out in the appended claims and illustrated in the accompanying drawings, in which:

Figure 4 is a detail perspective view of the valve.

Figure 5 is an enlarged vertical longitudinal section of the control valve for the air injectors.

Figure 6 is a detail cross section of the same on the line 6—6 of Figure 5.

Figure 7 is a detail vertical section of a modified form of cylinder showing how the same may be adapted to receive a cooling fluid such as brine or the like.

Figure 1:
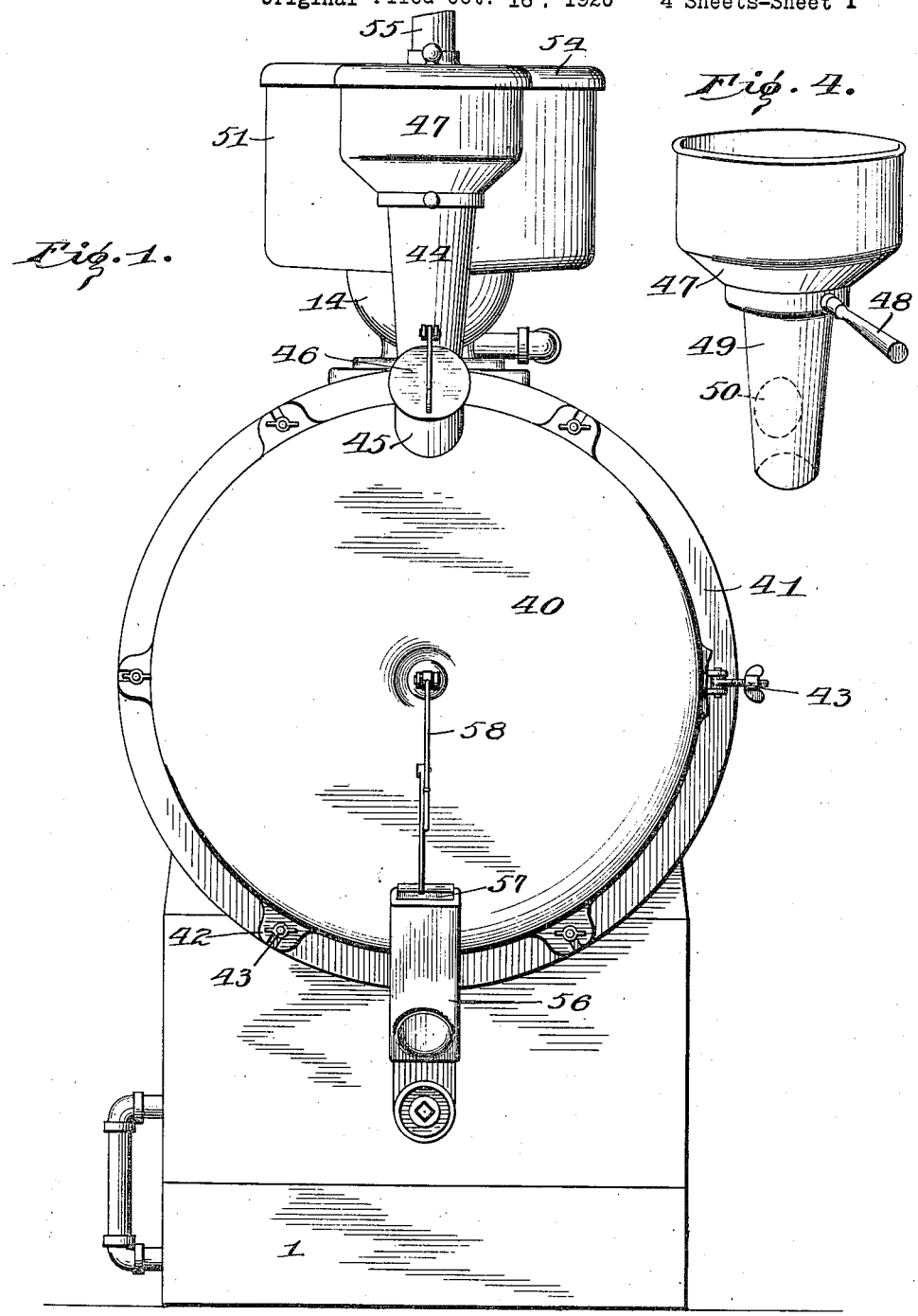
Figure 1 is a front elevation of one embodiment of my invention.

In the drawings, in which like numerals of reference indicate like parts in all of the figures, 1 is a base on which may be mounted the refrigerating or purifying chamber 2 which contains the brine circulating coils 3 and the air circulation partitions 4 and 5, together with the purifying filter 6, 7 being a collection space for the purified air. 8 is the air pump which draws pure air through a strainer 64 or draws air from the suction duct 61 via the three-way valve 62, pass 63 and pipe 65 when the shutoff valve 80 is closed. 10 is the drive shaft for the pumps which is driven by a silent chain drive 11 from a countershaft 12 that is in turn driven through a silent chain drive 13 by the prime motor 14, the chain drives 11 and 13 being encased as at 15 and 16 and run in an oil bath 18 and 17, respectively.

19 is a pinion on the shaft 12 which meshes with an external gear 20 that is keyed at 21 to a stub shaft 22 which has a separable joint 23 with the dasher shaft 24 on which the central dasher is placed, the dasher including radial blades 25 and circumferential blades 26, the latter cooperating with the corresponding blades 35 of the outer dasher 33.

27 is an internal gear which meshes with the pinion 19 and is carried on a disk 28 whose hub 29 has a bearing at 30 in the hub of the gear 20 and which turns on the stub shaft 22, the stub shaft 22 being itself journalled in a bearing 23ˣ on the support. 31 is a stuffing box on the boss 38 of the cylinder 39 through which the sleeve 29 passes, the sleeve 29 being journalled in the boss 38 and having a separable connection 32 with the dasher 33. The dasher 33 has a front hub 36 which forms a bearing for the shaft 24 of the central dasher and which has its bearing in the bearing 37 of the head 40 of the cylinder. The cylinder is provided with a flange 41 and the head has ears 42 cooperating with hinge bolts and wing nuts 43 for securing the head in place.

44 is a frustro-conical neck which delivers, through an opening in the head 40, the mix to the cylinder. The throat 44 receives the spout 49 of a funnel 47 which is provided with a handle 48 and a port 50 which registers with the discharge end 52 of the mix receiver 51 so that by turning the funnel 47 through the medium of the handle 48, the port 50 will register with or close the outlet of the spout 52. 45 is an opening closed by a cover 46 which may be used as a peep-hole, if desired, or through which coloring matter, or flavoring extracts may be admitted into the mix, or samples of the mix may be taken out.

The funnel 47 may also be used for the introduction of flavoring extracts or part of the ingredients to the mix in the cylinder.

53 is a strainer in the mix receiver 51, the latter being covered at 54 and the mix being introduced through the duct 55 from the mixing machine, not shown.

56 is the outlet from the cylinder which is provided in the cylinder head and is controlled by a gate valve 57 that is operated by the lever 58 and link 59.

Figure 2:
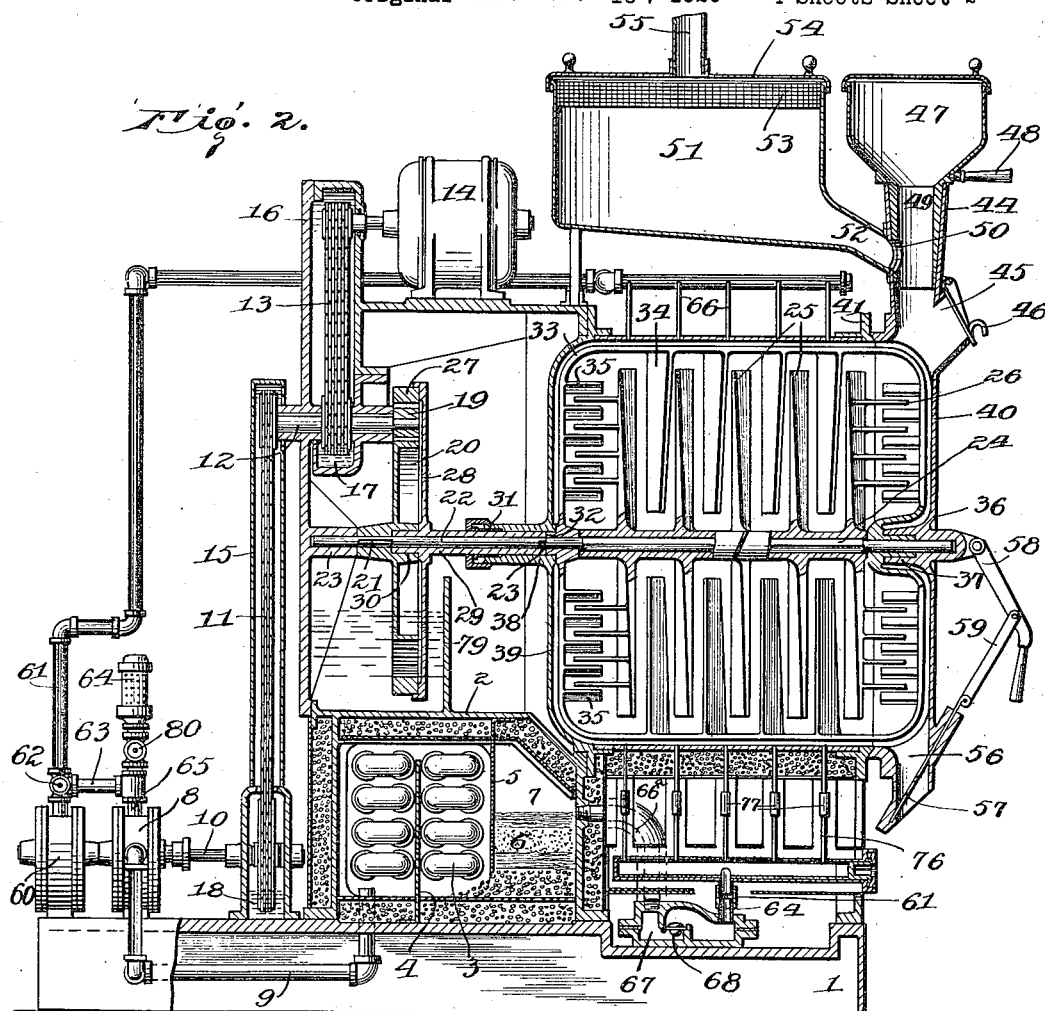
Figure 2 is a central vertical longitudinal section of the same.
Figure 3:
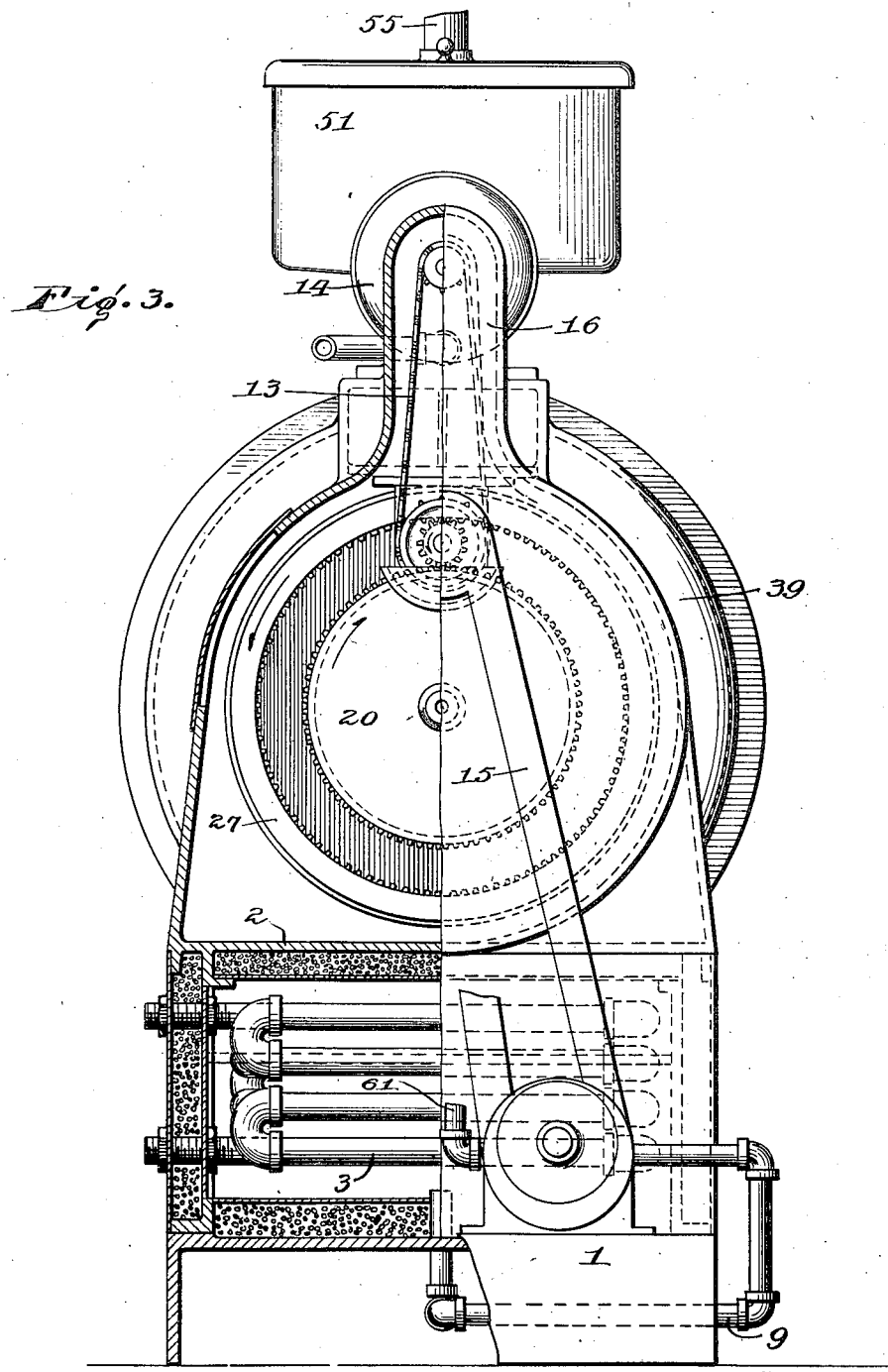
Figure 3 is a rear elevation and part section of the apparatus.
Figure 7:
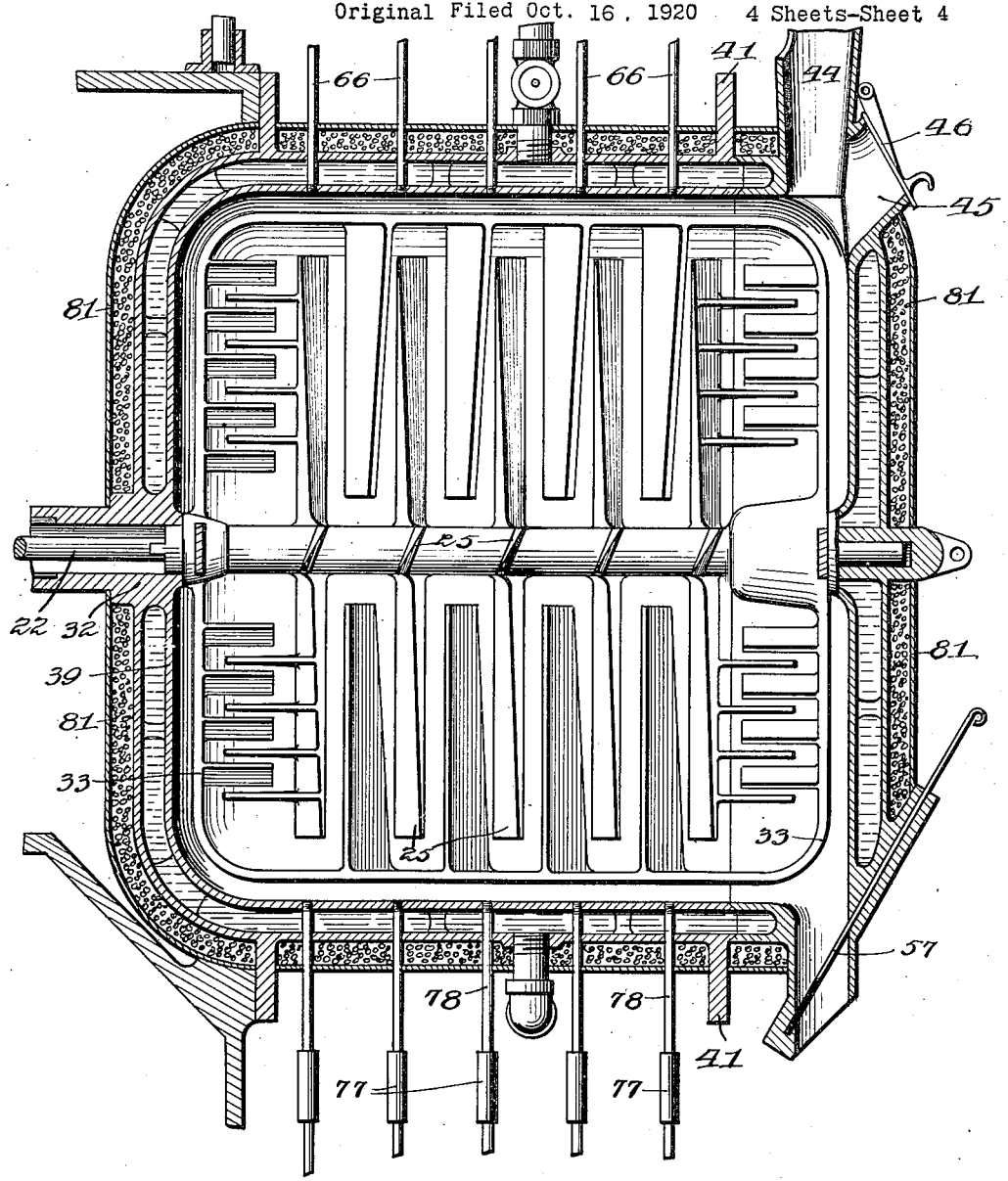

60 is an air suction pump delivering to atmosphere and coupled with the duct 61, the pump 60 being adapted to create a suction in the cylinder 39 by means of branches 66 which connect the duct with the interior of the cylinder at the top. The pump 60 may be mounted on the same shaft as the pump 8 and driven by the same driving mechanism therefor, if desired, (see Figure 2). 66ᵃ is a duct which conveys refrigerated and purified air from the chamber 7 to the chamber 67 of the box of the valve mechanism 68 from which it is passed through the discharge duct 64 and duct 70 into the interior of a hollow cylindrical valve 72 which has provision at 73 for the insertion of a square instrument by which the valve may be turned for regulating purposes, the valve having V-shaped openings 74 for registering with the entrances 75 of the air injecting pipes or nozzles 76, the latter being connected by separable connections 77 with the ducts 78 that lead into the interior of the cylinder.

79 is a wall which acts as a dam for lubricant in which the gears 20 and 27 run.

If desired, the cylinder 39 may be provided with a jacket 81 suitably insulated and adapted to receive circulating chilled brine for refrigerating purposes.

In practicing the invention, the mix is introduced into the receiver 51 and allowed to flow down into the cylinder 39 where it is encountered by the dasher and rapidly agitated to cause the same to be aerated and swell. At the same time, the pump 8 forces air through the duct 9 and through the cooling and purifying unit 2 and branches 66, etc., to the valve 72, by which it is distributed to the various laterals 76 which deliver the air through the duct 78 into the interior of the cylinder where it is forced through the mix. At the same time, a partial vacuum is produced at the top of the cylinder by the suction created in duct 61, either by the pump 60 or, when the return circulation is employed, then by the pump 8. It will thus be seen that the pure cold air passing through the mix not only refrigerates it, but removes the impurities as well.

In this application I make no claim to the method of process herein described as that forms the subject matter of my divisional application aforesaid.

While I have illustrated a preferred embodiment of the invention I desire it understood that changes in the details of construction and modifications in the arrangement of parts may be made without departing from the scope of the invention or that of the appended claims.

What I claim is:

1. In ice cream freezing apparatus, a cylinder, dashers therein, means to rotate said dashers, means to inject air into the cylinder, means to exhaust air from the cylinder, means to introduce the mix to the cylinder, means to effect exit of the mix from the cylinder, and means for refrigerating the air before it is injected into the cylinder.

2. In ice cream freezing apparatus, a cylinder, dashers therein, means to rotate said dashers, means to inject air into the the cylinder, means to exhaust air from the cylinder, means to introduce the mix to the cylinder, means to effect exit of the mix from the cylinder, means for refrigerating the air before it is injected into the cylinder, and means for purifying the air to be injected into the cylinder.

3. In ice cream freezing apparatus, a cylinder, an air refrigerating chamber, air injecting nozzles leading into the cylinder and in communication with the air refrigerating chamber, a valve controlling said nozzles, an air pump for forcing air into said air refrigerating chamber and causing it to be injected into the cylinder, means for introducing the mix into the cylinder and withdrawing the same from the cylinder, and agitators within the cylinder and means for driving the agitators.

4. In ice cream freezing apparatus, a cylinder, an air refrigerating chamber, air injecting nozzles leading into the cylinder and in communication with the air refrigerating chamber, a valve controlling said nozzles, an air pump for forcing air into said air refrigerating chamber and causing it to be injected into the cylinder, means for introducing the mix into the cylinder and withdrawing air from the cylinder, and agitators within the cylinder and means for driving the agitators.

5. In ice cream freezing apparatus, a cylinder, means for introducing the mix to the cylinder, means for withdrawing the mix from the cylinder, a set of agitators rotative in the cylinder, driving mechanism for the agitators, an air refrigerator, a duct from said refrigerator to said cylinder including provisions for injecting the refrigerated air into the mix, an air pump delivering into said air refrigerator, a motor and power transmitting connections from said motor to said agitators and to said air pump.

6. An ice cream freezing apparatus, a cylinder, means for introducing the mix to the cylinder, means for withdrawing the mix from the cylinder, a set of agitators rotative in the cylinder, driving mechanism for the agitators, an air refrigerator, a duct from said refrigerator to said cylinder including provisions for injecting the refrigerated air into the mix, an air pump delivering into said air refrigerator, a motor and power transmitting connections from said motor to said agitators and to said air pump, and an air withdrawing duct communicating with said cylinder and with said air pump whereby a circulation of air may be maintained from said air refrigerating chamber through the mix and back again to said air refrigerating chamber.

7. An ice cream freezing apparatus, a supporting cylinder having a detachable head mounted on said support, means for introducing and removing the mix through said head into said cylinder, said cylinder and head having bearings, dashers having parts journalled in said bearings, a motor and power transmitting connections to said dashers, means for refrigerating the mix, said means comprising apparatus for causing a passage of the refrigerated air through the mix.

8. In ice cream freezing apparatus, a supporting cylinder having a detachable head mounted on said support, means for introducing and removing the mix through said head into said cylinder, said cylinder and head having bearings, dashers having parts journalled in said bearings, a motor and power transmitting connections to said dashers, means for refrigerating the mix, said means comprising apparatus for circulating air through the mix and refrigerating and purifying the air in circulation.

9. In ice cream freezing apparatus, a cylinder, means for introducing the mix to and removing it from the cylinder, refrigerated air injecting nozzles at the bottom of the cylinder, air removing suction nozzles at the top of the cylinder, means for withdrawing air through said removing nozzles from the same and for forcing air through said injecting nozzles into the same, means for refrigerating the air before it is forced into the cylinder, and means for agitating the contents of the cylinder.

10. In ice cream freezing apparatus in which is provided a cylinder to receive the mix, said cylinder having a removable head, a throat having an opening into the cylinder through the head, a funnel having a spout valve in the throat and a mix receiver delivering into the throat and controlled by said spout.

11. In ice cream freezing apparatus, a cylinder, means for delivering ice cream mix into the cylinder, means for injecting refrigerated air into the cylinder and removing air from the cylinder to effect a circulation through the cylinder to freeze the contents of the cylinder, said air injecting means including a plurality of fine nozzles and a single control valve for said nozzles and means for delivering the refrigerated air to the control valve for distribution to the nozzles.

JACOB GUSTAVE PECK.